US007935176B2

(12) United States Patent
Burton et al.

(10) Patent No.: US 7,935,176 B2
(45) Date of Patent: May 3, 2011

(54) OXYGEN EXTRACTION APPARATUS AND PROCESS

(75) Inventors: Rodney L. Burton, Champaign, IL (US); Peter J. Schubert, Naperville, IL (US); Filip Rysanek, Torrance, CA (US); Paul Fenoglio, Denver, CO (US); Mike Hutches, Aurora, IL (US)

(73) Assignee: Packer Engineering, Inc., Naperville, IL (US)

( * ) Notice: Subject to any disclaimer, the term of this patent is extended or adjusted under 35 U.S.C. 154(b) by 174 days.

(21) Appl. No.: 12/256,877

(22) Filed: Oct. 23, 2008

(65) Prior Publication Data

US 2009/0269273 A1 Oct. 29, 2009

Related U.S. Application Data

(60) Provisional application No. 60/960,964, filed on Oct. 23, 2007.

(51) Int. Cl.
    *B01D 53/00* (2006.01)
(52) U.S. Cl. ............... 95/32; 96/188; 423/579; 202/158
(58) Field of Classification Search .................. 423/579; 202/158; 95/32; 96/188
    See application file for complete search history.

(56) References Cited

U.S. PATENT DOCUMENTS

| 4,319,201 A | 3/1982 | Bush et al. |
| 4,801,411 A * | 1/1989 | Wellinghoff et al. ............. 264/7 |
| 5,183,481 A | 2/1993 | Felder |
| 5,536,378 A * | 7/1996 | Gibson et al. ................. 204/234 |
| 5,750,450 A | 5/1998 | Bull et al. |
| 6,372,019 B1 * | 4/2002 | Alferov et al. .................... 95/29 |
| 2004/0004184 A1 * | 1/2004 | Schubert ....................... 250/284 |

OTHER PUBLICATIONS

Schnurre, Thermodynamics and phase stability in the Si-O system, Journal of Non-Crystalline Solids 336 (2004) 1-25.*
B. Nacke, et al, Induction Skull Melting of Oxides and Glasses in Cold Crucible, International Scientific Colloquium Modelling for Materials Processing, Riga, Jun. 8-9, 2006, pp. 209-214.
Tevepaugh, J.A., Penny, M.M., "Chemically Reacting One-Dimensional Gas-Particle Flows," Oct. 1975, CASI 76N15263.
W. Carrier, III, et al, The Nature of Lunar Soil, Journal of the Soil Mechanics and Foundations Division, Oct. 1973, SM10-10099.
Shuttleworth, R., "The Surface Tension of Solids," Proc. Phys. Soc. A, No. 63, pp. 444-457, 1950.
Jones, J.A., Blue, G.D., "Oxygen Chemisorption Compressor Study for Cryogenic Joule-Thompson Refrigeration," J. Spacecraft, vol. 25, No. 3, 1988, pp. 202-208.

(Continued)

*Primary Examiner* — Melvin C Mayes
*Assistant Examiner* — Melissa Stalder
(74) *Attorney, Agent, or Firm* — Hartman & Hartman, P.C.; Gary M. Hartman; Domenica N. S. Hartman

(57) ABSTRACT

A facility and process capable of extracting oxygen in extraterrestrial environments from materials available in extraterrestrial environments, for example, on planets, planetoids, etc. The facility extracts oxygen from a mineral-containing solid material and is configured to form a free-falling molten stream of the solid material, evaporate at least a portion of the molten stream and produce a vapor containing gaseous oxygen, create a supersonic stream of the vapor, condense constituents of the supersonic stream to form particulates within the supersonic stream, separate the gaseous oxygen from the particulates, and then collect the gaseous oxygen.

22 Claims, 3 Drawing Sheets

OTHER PUBLICATIONS

K.N. Joshipura, et al, Electron Impact Ionization Cross-Sections of Plasma Relevant and Astrophysical Silicon Compounds: SiH4, Si2H6, Si(CH3)4, SiO, SiO2,SiN and SiS, International Journal of Mass Spectrometry, v. 261, pp. 146-151, (2007).

Edward L. Patrick, Silicon Carbide Nozzle for Producing Molecular Beams, Rev. Sci. Instr., No. 77, paper 043301, 2006.

Gunnar Eriksson, Thermodynamic Studies of High Temperature Equilibria, Chemica Scripta, No. 8, pp. 100-103, 1975.

S.M. Schnurre, et al, Thermodynamics and Phase Stability in the Si-O System, J. Non-crystal Solds, No. 336, pp. 1-25, 2004.

W. Hertl and W.W. Pultz, Disproportionation and Vaporization of Solid Silicon Monoxide, J. Am. Ceramic Soc., v. 50, No. 7, 1967, pp. 378-381.

Chase, M. W., et al., "JANAF Thermochemical Tables", 3rd Ed., Part II, Cr-Zr, ACS, in J. Phys. and Chem. Ref. Data, vol. 14, Supplement No. 1, 1985.

Senior, C.L. 'Lunar Oxygen Production by Pyrolysis.' In: Resources of Near-Earth Space [online]. Edited by J.S. Lewis et al. University of Arizona Press, 1993, pp. 179-197.

* cited by examiner

OXYGEN EXTRACTION APPARATUS AND PROCESS

CROSS REFERENCE TO RELATED APPLICATIONS

This application claims the benefit of U.S. Provisional Application No. 60/960,964, filed Oct. 23, 2007, the contents of which are incorporated herein by reference.

BACKGROUND OF THE INVENTION

The present invention generally relates to facilities and apparatuses suitable for operation in extraterrestrial environments, and more particularly to processes and facilities for extracting oxygen from minerals that can be found on planets, planetoids, etc.

Oxygen extraction from in situ space minerals is valuable for life support, propulsion, and as a chemical reagent for use in outer space travel. It may be argued that an efficient means for oxygen production has the potential to dramatically accelerate space travel, space-based economic development, and settlement on worlds beyond earth. An in situ resource utilization (ISRU) facility capable of producing many times its own launch weight in oxygen would dramatically lower mission mass and cost for subsequent travel to oxygen depots and beyond. As such, an organization operating such a depot in space (for example, on a planet, planetoid, or manmade satellite or space station) could charge a premium for this valuable commodity.

Oxygen extraction methods favored by, for example, the United States National Aeronautics and Space Administration (NASA), include molten oxide electrolysis (MOE), hydrogen reduction of ilmenite ($FeTiO_3$), and carbo-thermal reduction of ilmenite. These methods were apparently downselected from a number of candidate methods. Although the above three methods represent a relative degree of maturity, the technical limitations of each make it unclear that they can achieve the efficiency, convenience, and weight leverage performance metrics needed for a profitable ISRU oxygen depot.

MOE involves electrolysis of molten minerals by inserting a cathode and an anode into a heated vat of liquid rock, applying a potential to the electrodes to cause oxygen bubbles to form and rise from one of the electrodes, and then capturing the oxygen. Although MOE is simple in concept, tremendous demands are placed on the electrode material, such that a long-lived component may be difficult or impossible to construct, necessitating a substantial number of spare parts. Heating of the molten minerals is also a challenge, and limits the scale of the device. The crude nature of this simple concept also does not lend itself to a clean and easily-maintained apparatus.

Hydrogen and carbo-thermal reduction of ilmenite are akin to chemical reactor processes on earth. Either hydrogen or methane is heated to an elevated temperature to shift the oxygen atoms from crushed and beneficiated minerals onto another molecule. The oxygen atoms are isolated in a second step, such as electrolysis of water, and the resulting hydrogen or hydrocarbon gas is available as a useful byproduct or for recycling. Key challenges for ilmenite reduction include the need to avoid all leaks of process gasses. For lunar processing, any loss of reaction gasses must be made up with a resupply of those gasses from earth. A simple system would require a larger mass of resupply; a more complex system (such as double-wall containment) would demand a larger factory launch mass. Furthermore, the use of ilmenite requires that this specific mineral be selectively removed from regolith, or powdered rock, that blankets the Moon and other airless planetoids. Ilmenite beneficiation has been demonstrated with analog materials, but the ability to do so in the harsh environment of the lunar surface cannot be proven without experiments in the actual operating environment. Also, ilmenite is not uniformly distributed across the Moon, so that certain locations are less suitable than others. These factors detract from the appeal of ilmenite reduction.

Another limitation of the methods discussed above is the need for gravity to accomplish the process steps, necessitating the placement of the ISRU facility on a planet.

In view of the above, an ISRU facility for oxygen extraction would likely be more technologically and commercially successful if capable of a high ratio of oxygen produced-to-factory launch mass, simple or autonomous operation, low mass of spare parts, the ability to operate in low-gravity (e.g., a planetoid) and microgravity (e.g., orbital) environments, and insensitivity to regolith feedstock.

BRIEF DESCRIPTION OF THE INVENTION

The present invention provides a facility and process capable of extracting oxygen in extraterrestrial environments from materials available in extraterrestrial environments, for example, on planets, planetoids, etc.

According to a first aspect of the invention, the facility extracts oxygen from a mineral-containing solid material. The facility is configured to form a free-falling molten stream of the solid material, evaporate at least a portion of the molten stream and produce a vapor containing gaseous oxygen, create a supersonic stream of the vapor, condense constituents of the supersonic stream to form particulates within the supersonic stream, separate the gaseous oxygen from the particulates, and then collect the gaseous oxygen.

According to a second aspect of the invention, the process includes forming a free-falling molten stream of the solid material, evaporating at least a portion of the molten stream and producing a vapor containing gaseous oxygen, creating a supersonic stream of the vapor, condensing constituents of the supersonic stream to form particulates within the supersonic stream, separating the gaseous oxygen from the particulates, and then collecting the gaseous oxygen.

A significant advantage of this invention is that the facility and process provide a holistic operational concept for extracting oxygen in extraterrestrial environments from materials available in extraterrestrial environments. The facility is capable of operating in both low-gravity (e.g., a planetoid) and microgravity (e.g., orbital) environments, and can therefore be located in environments where the process feedstock (regolith) is readily available. The facility is also capable of simple or autonomous operation, and have a high ratio of oxygen produced-to-factory launch mass. Other advantages include a modular construction whose replacement parts are low mass.

Other objects and advantages of this invention will be better appreciated from the following detailed description.

DETAILED DESCRIPTION OF THE INVENTION

Figure 1:
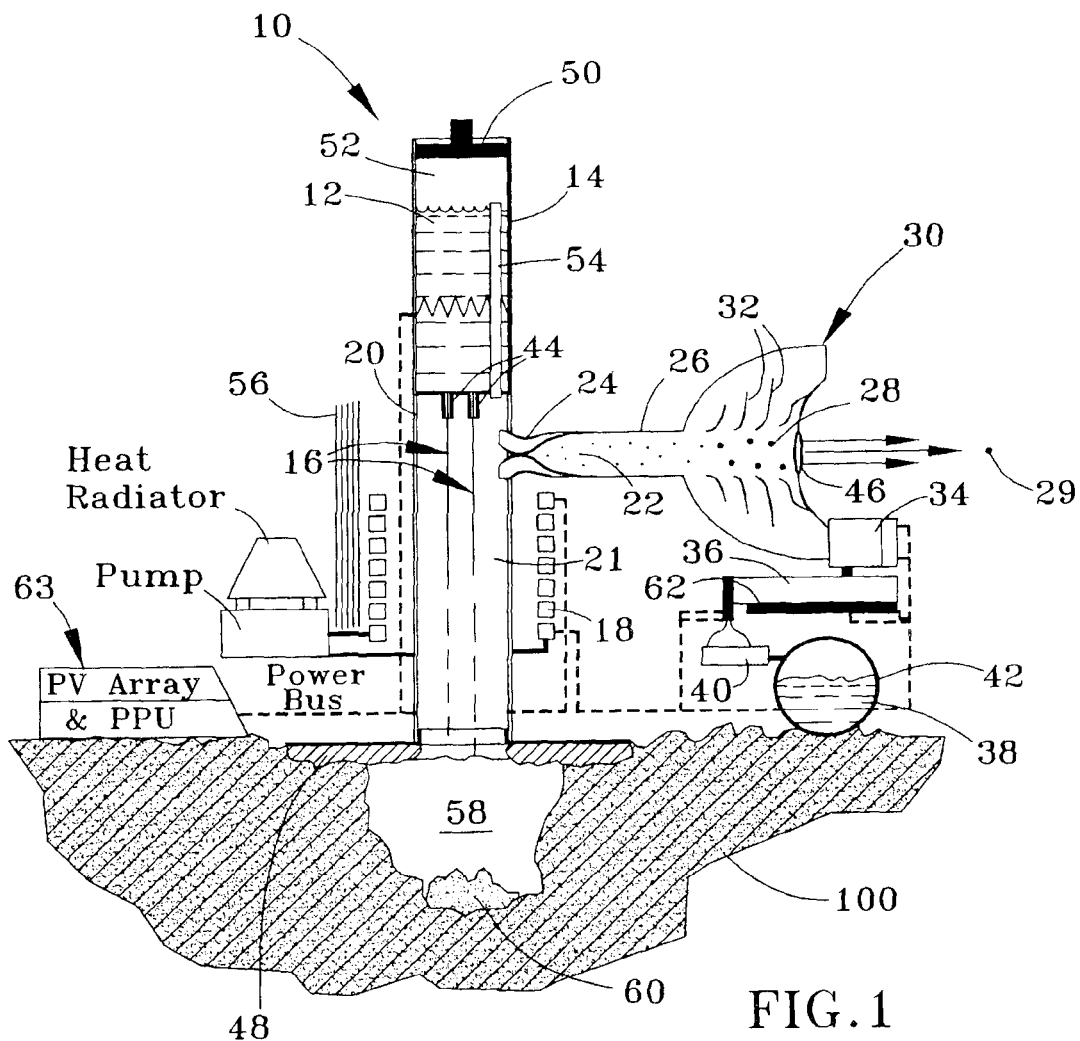
FIG. 1 schematically represents an oxygen extraction facility in accordance with an embodiment of the invention.

FIG. 1 schematically represents an ISRU facility 10 capable of oxygen extraction in low-gravity and microgravity environments. The facility 10 may be referred to as a supersonic dust roaster (SDR), in the sense that it is capable of roasting oxygen from regolith, such as from the lunar soil. The facility 10 is depicted as being located on the lunar surface 100, and will be discussed as such, though it should be understood that the facility could be located in a variety of other low-gravity and microgravity environments, such as another planetoid, in orbit, alongside an asteroid, etc.

The facility 10 applies certain properties of compressible multi-phase supersonic flow to a mineralic vapor. Mineral vapors of about 100,000 Pa typically require temperatures on the order of about 3000 K, and achieving such temperatures within a highly-oxidizing environment precludes containment in almost all known refractory materials. To avoid this limitation, the facility 10 melts a supply of regolith 12 in a hopper 14 (for example, at a temperature of about 1650 K or more), which is then allowed to free-fall as a molten stream 16 from the hopper 14. During free-fall, the stream 16 is further heated to a temperature sufficient to vaporize minerals within the stream 16, and without the stream 16 physically contacting containment walls 20 surrounding the stream 16. As discussed in more detail below, conductive constituents of regolith are present in amounts to render the regolith 12 sufficiently conductive to enable the molten regolith (magma) stream 16 to be inductively heated. In the facility 10 shown in FIG. 1, radio frequency (RF) coils 18 are used to generate electromagnetic RF energy to quickly heat the molten regolith stream 16 and produce a vapor of preferably most constituents of the stream 16. Pressurized extrusion of the molten regolith stream 16 drives the flow, allowing the process to operate in low-gravity and microgravity environments.

The containment walls 20 form a chamber 21 that is sealed at its upper end by the hopper 14, and at its lower end with a seal 48 between the walls 20 and the lunar surface 100. Escape of the mineral vapors produced during inductive heating is limited to a de Laval nozzle (convergent-divergent, CD, or con-di nozzle) 24, shown oriented transverse to the molten regolith stream 16. As discussed in more detail below, the mineral vapors are expected to reach pressures of about one atmosphere (about 100 kPa) or more within the containment chamber 21. As a result of the pressure differential between the elevated pressure within the chamber 21 and the near-vacuum (around $3 \times 10^{-15}$ atm) lunar atmosphere surrounding the facility 10, a vapor stream 22 exhausts through the de Laval nozzle 24 as a supersonic flow. The vapor stream 22 proceeds through a drift tube 26 downstream of the nozzle 24, where the stream 22 is cooled and colloids condense and grow into particulates (or droplets) 28 by accretion and agglomeration. Once the solid particulates 28 within the vapor stream 22 are sufficiently massive, they detach from the flow and continue as ballistic particles ("ballista") 29, while the sudden flow area increase and the low lunar vacuum causes the remaining vapor (gaseous oxygen) to expand dramatically within a radial expansion region 30 at the exit of the supersonic drift tube 26. The ballista 29 are shown as being ejected from the facility 10 through an opening 46, whereas the gaseous oxygen remains in gaseous form and is removed from the vapor stream 22 with skimmers 32 within the expansion region 30. The skimmers 32 direct the gaseous oxygen toward radial extremities of the expansion region 30, where pumps 34 are shown for drawing the gaseous oxygen into a plenum 36 where radiative cooling tubes (not shown) or other suitable equipment serves to condense the hot oxygen gas as liquid oxygen, for example, at a temperature of about 200 K. Finally, a liquefaction apparatus 40 transfers the liquid oxygen (LOX) 38 to a tank 42. Condensation of gaseous oxygen to liquid oxygen within the plenum 36 can be accomplished by several means known to those skilled in the arts, including techniques discussed in more detail below.

Prior to use in the facility 10, the regolith 12 is preferably lightly beneficiated to reduce the risk of clogging of one or more apertures 44 through which the molten stream 16 exits the hopper 14. An 18 mesh (1 mm) screen is believed to be adequate for this purpose, and data obtained from the Apollo moon missions suggest that about 80% and about 93% of lunar regolith should pass through a 18 mesh sieve.

Regolith available on the Moon and other planets and planetoids comprise various minerals that contain elements including calcium, aluminum, iron, magnesium, silicon, titanium, and oxygen. Published reports indicate that lunar regolith is completely melted at about 1750 K (about 1477° C.), though there are several components of the lunar soil with melting points much higher than this. Approximate melting points (MP) and boiling points (BP) for seven simple minerals believed to represent the bulk of the lunar regolith composition are as follows: ferrous oxide (FeO), MP=1377° C., BP=3414° C.; ferric oxide ($Fe_2O_3$), MP=1565° C.; silica ($SiO_2$), MP=1713° C., BP=2950° C.; titania ($TiO_2$), MP=1843° C., BP=2972° C.; alumina ($Al_2O_3$), MP=2054° C., BP=3000° C.; magnesia (MgO), MP=2826° C., BP=3600° C.; and calcia (CaO), MP=2899° C. Nonetheless, regolith is believed to be largely molten at about 1400 K (about 1127° C.), and by about 1723 K (about 1450° C.) has a viscosity of about 5 to 7 Poise (similar to heavy motor oil at room temperature). As such, the hopper 14 should be of a type capable of heating the regolith to temperatures of at least 1400 K and preferably about 1723 K or more. The flow characteristics of the molten regolith 12 should be a relatively easy process variable to control, since viscosity is temperature dependent. Because regolith is believed to be insufficiently conductive at ambient lunar temperatures to permit heating by induction, the hopper 14 is preferably heated by other means, for example, resistive heating using thoriated tungsten elements for long-life.

Heating the regolith 12 to about 1750 K should not only enable the regolith 12 to melt and flow, but also become electrically conductive, particularly if the composition of the regolith melt is dominated by liquid FeO (weustite). Depending on the concentration of FeO in the regolith 12, the electrical conductivity of the molten regolith stream 16 is expected to be approximately 25 siemens•m, which is sufficient to enable inductive heating of the molten regolith stream 16. Inductive heating methods and equipment are well known in the art, a common example of which is the inductive heating of molten silicon to grow single-crystal ingots (Czochralski method) for the integrated circuit industry.

The volumetric flow rate of the molten regolith through each tubular aperture 44 at the bottom of the hopper 14 can be estimated using the equation for flow through a tube of length L and radius R, driven by a pressure gradient ΔP, and having a viscosity a, by:

$$Q = (\pi/8\eta)(\Delta P/L)R^4 \qquad (1)$$

Flow rates can be back-calculated from system requirements. For example, to produce 10 metric tons of oxygen per year with 70% utilization (per NASA 2007 SBIR call, section X4.05) would require an average oxygen throughput of about 0.00045 kg/s. This can be calculated back to a flow rate for the molten regolith.

Stage yield at the gas expansion region 30 can be set by design, for example, at about 95%, corresponding to a cross-sectional ratio of about 20:1 for the region 30 to the opening 46 for the ballista 29.

Oxygen yield from regolith at pyrolysis temperatures of about 2500 to about 3000 K has been reported to range from about 19.6% to about 24%. Confirmation of this value can be obtained using a different approach. Based on research that indicates volatiles in regolith account for up to 83% of the total regolith mass, most of the gaseous oxygen will likely come from the dissociation of $SiO_2$, $TiO_2$, and $Al_2O_3$ and account for about 31% of the total vapor fraction. Oxygen vapor is about 33% of the total vapor pressure of silica, and approximately 46% of the regolith is silica, so the oxygen fraction of the vapor would be about one third. Multiplying these two ratios (0.83×0.33) yields about 27%, which is higher than the reported values of about 19.6% to about 24%. To be conservative, a 20% oxygen yield will be used to estimate the required flow rate of molten regolith with the following calculation.

$$0.00045 \text{ kg/s} \div 0.95 \div 0.20 = 0.024 \text{ kg/s} \quad (2)$$

By matching equations (1) and (2), the radius (R) of each stream aperture 44 can be solved for a given tube length (L) of the aperture 44. Consequently, the aperture radius (R) can be varied by using a combination of gravitational head and static pressure on top of the liquid column within the hopper 14.

Bubbles flowing upward through the apertures 44 should be avoided, since bubbles would disrupt the flow of the molten regolith from the apertures 44, disperse the molten stream 16, and allow vapors to escape the containment chamber 21. If the height of the liquid column within the hopper 14 is sufficient to overcome the back-pressure within the chamber 21, the flow from the apertures 44 should be relatively smooth and predictable. The head pressure must overcome the process pressure P within the chamber 21, so that:

$$P \leq \rho g_m h \quad (3)$$

where $\rho$ is density, $g_m$ is the Moon's gravitational acceleration, and h is the head height. At the flow rate calculated above, the head height must be at least two meters. For higher process throughput rates, the required head can become unwieldy, and likely necessitate a different solution.

The hopper 14 is shown in FIG. 1 as equipped with a lid 50 sealing a head space 52 above the liquid regolith 12. A pressure bypass tube 54 allows vapor communication between the process chamber 21 and the head space 52 for the purpose of preventing bubbles from entering the hopper 14 through the apertures 44. In the configuration represented in FIG. 1, the sealed hopper 14 and bypass tube 54 must be periodically opened and recharged with a fresh batch of regolith fines. Alternatively, fines could be introduced into the hopper 14 through an airlock (not shown) to allow continuous operation of the facility 10.

While various heating methods may exist or be developed in the future, RF heating of the molten regolith stream 16 is believed to be preferable over alternative heating methods, for example, microwave heating, which does not scale well to large applications. RF inductive heating is capable of very rapid heating rates, which makes heating of the free-falling molten stream 16 possible. As known in the art, inductive heating works on a similar principle as an electrical transformer. A transformer has two coils, each having different windings but sharing the same core. Oscillating current passed through one coil generates a magnetic field whose magnetic lines of force travel through the core (usually a soft iron) to induce a current in the second coil. Based on the ratio of their windings (and the magnetizability of the core), the current in the second coil is a multiple of the current in the first coil (with a lower voltage to conserve total power). In the facility 10 of FIG. 1, inductive heating occurs between the conductive molten stream 16 within the RF coil 18 when power is applied to the coil 18, and inductive coupling occurs between the molten stream 16 and the coil 18 without a core since the magnetic field generated by the coil 18 fills the portion of the chamber 21 surrounded by the coil 18. Free (conduction) electrons within the molten stream 16 respond to the magnetic field and begin moving rapidly within the molten matrix of the stream 16, creating eddy currents. By appropriately choosing the RF coil frequency, the eddy currents can absorb a great deal of energy, and intense heating of the molten regolith within the stream 16 occurs through inelastic collisions (phonons) with the atoms of the molten regolith material. The stream 16 of conductive molten regolith dropping through the RF coil 18 will heat very quickly and begin to vaporize. Given a sufficient power level and duration, the volatiles within the lunar regolith (83% by weight) is vaporized, and the gaseous oxygen intended for harvest is released.

Figure 2:
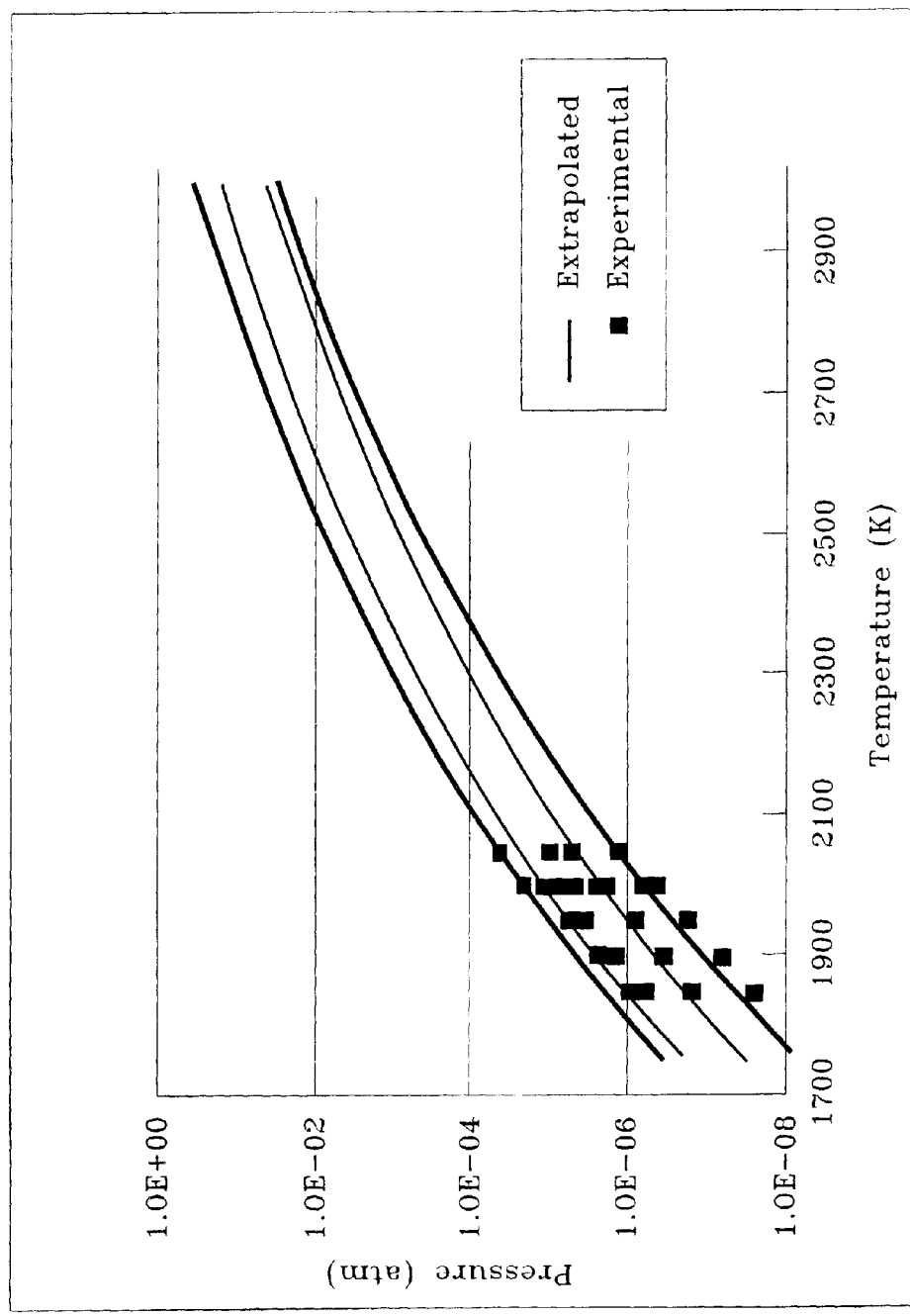
FIG. 2 is a graph plotting experimental and extrapolated data of vapor pressure above silica versus temperature for various species dissociated from silica.

Prior research concerning vapor separation (also known as thermal pyrolysis) of lunar oxygen has investigated the high temperature properties of mineral vapors. Temperature measurements up to 3000 K have been reported, but pressure measurements (using Knudsen cells) have only been reported below 2100 K and then extrapolated to higher temperatures. FIG. 2 is a graph plotting a combination of experimental and theoretical results using only silicon dioxide and reported in Schick, H. L., "A Thermodynamic Analysis of the High-Temperature Vaporization Properties of Silica," Chem. Rev., 60, 331-362 (1960). Vapor pressures over molten silica in the ranges suitable for operating the supersonic nozzle 24 are summarized in Table I.

TABLE I

| Temperature (K) | Total Pressure (kPa) |
|---|---|
| 3070 | 105 |
| 3000 | 71 |
| 2950 | 51 |
| 2750 | 10 |

As another means to estimate vapor pressure versus temperature, the pressure over a mixture of alumina, silica, titania and ferrous oxide at 3000 K has been previously predicted to be about 26 kPa by extrapolating from rate constants. A study at about 2750 K indicates an operation capable of meeting the needs of the facility 10, though with slightly higher masses because the evaporation rate is lower. Suitable operation at the lower temperature of 2750 K would also appear to be viable for the facility 10.

With a sufficient pressure gradient, an appropriately-designed nozzle 24 will create a supersonic vapor stream 22 for purposes of this invention. Supersonic flows are characterized by Mach number, and a suitable flow velocity downstream of the throat of the nozzle 24 is believed to be about Mach 2, as such a velocity will drop the temperature of the vapor stream 22 by a factor of two to allow the mineral vapors to condense and form the particulates 28, achieving the necessary phase separation of the solids from the $O_2$ gas. Nonetheless, lower and higher Mach numbers are also within the scope of this invention. The temperature drop within the supersonic nozzle 24 and along the drift tube 26 can be radiated away as heat into space during cooling of the vapor 22. Below the melting points of the regolith constituents noted previously, the vapor components become supersaturated. According to Le Chatlier's principle, a system out of equilibrium will tend towards that equilibrium with a rate that increases as the departure from equilibrium increases. At a point which can be calculated, molecules within the vapor 22 will begin to collect to form liquid droplets or solid particles (colloids). With further transit time within the drift tube 26, these droplets and particles agglomerate into the larger particulates 28. Once particle size has increased sufficiently that momentum transfer from gaseous molecules is negligible, the particulates 28 continue ballistically down the drift tube 26 with a slip velocity relative to the gas. The resulting ballista 29 are eventually allowed to exit the expansion region 30 through the opening 46 as slag.

A study of aluminum colloid formation and particle growth rate reported in Leon, H. I, Saheli, F. P., Mickelson, W. R., "Aluminum Colloid Formation by Homogenous Nucleation in a Supersonic Nozzle," CASI N67-36947 (1967) (hereinafter, Leon et al.), is adapted here for analyzing the condensation of silicon monoxide (SiO). Silicon monoxide does not have a liquid phase, but instead sublimes upon heating and deposits upon cooling. The treatment is the same as the study of aluminum colloid formation in Leon et al., with free surface energy (liquidus) replaced by surface energy (solidus) as appropriate. During isentropic expansion, the rate of change of pressure with temperature is given by $$dP/dT = (C_p/R)(P/T) \quad (4)$$

where $C_p$ is the specific heat of the vapor, R is the gas constant, P is pressure, and is temperature. The rate of change of saturation pressure with temperature is given by the Clausius-Clapeyron equation:

$$dP_\infty/dT = h_{fg}/(V_v - V_l)T \quad (5)$$

where the volumes of the vapor ($V_v$) and liquid/solid ($V_l$) is approximated by just the vapor volume $V_v$, and $h_{fg}$ is the latent heat of vaporization. Using the ideal gas law, the Clausius-Clapeyron equation can be rewritten as:

$$dP_\infty/dT = (P/T^2)(h_{fg}/R) \quad (6)$$

Comparing this to the rate of change of pressure with temperature with isentropic expansion gives:

$$(dP_\infty/dT)/(dP/dT) = (Ph_{fg}/RT^2)/C_p(P/RT) = (h_{fg}/T)/C_p \quad (7)$$

If this ratio is greater than unity, the material will condense or deposit during a supersonic expansion. For silicon monoxide, the heat of vaporization has been reported as about 303 kJ/mol. Heat capacity ($C_p$) for SiO varies with temperature and is reported to have the following values: 37.3 kJ/mol·K at 2000 K, and 37.8 kJ/mol·K at 3000 K. The ratio in equation (4) is 2.7 at 3000 K, and increases to 6.7 at 1200 K, well above unity. This indicates that vapor pressure drops faster than isentropic expansion with decreasing temperature over the entire temperature range of interest. Therefore, SiO vapor should condense/deposit within the vapor stream 22.

The length of the drift tube 26 must be sufficient to form particulates 28 with high slip velocity in the remaining gas and vapor in the stream 22. The critical size for colloid formation can be estimated using the treatment reported in Leon et al., resulting in the equation:

$$r^* = 2\sigma/\rho_L RT \ln(P/P_\infty) \quad (8)$$

where r* is the critical droplet radius, σ is the surface free energy, and $\rho_L$ is the density of the liquidus/solidus state. The surface energy for SiO(s) does not appear to be available, but is believed to be closely estimated by comparison with Si(s) and $SiO_2(s)$, which have values of 39.6 and 35.4 $mJ/m^2$, respectively. For subsequent calculations, the median value of 37.5 $mJ/m^2$ will be assumed for the monoxide form. Density of SiO has been reported as 2150 $kg/m^3$.

For the ratio of $P/P_\infty$, approximations for the stagnation pressure and the exit pressure of the drift tube 26 of about 500 kPa and 50 kPa, respectively, will be used. Furthermore, an exit temperature of about 1200 K is assumed. In previous research SiO colloids were concluded to begin forming at temperatures greater than 1500° C., such that the present assumptions are likely to be conservative. The result gives a critical colloid radius of about 1.5 nm (15 Angstroms). The rate of colloid formation, J, was reported in Leon et al. as:

$$J = (P/kT)^2 1/\rho_L (2\sigma M/\pi N_a)^{1/2} \cdot e^{-(4\pi r^* r^* \sigma/3 \ kT)} \quad (9)$$

where M is the molecular weight and $N_a$ is Avogadro's number. Computing the value for SiO yields $1.4e^{39}$ in nuclei per $m^3$ per second. It has been reported that for SiO in a supersonic drift tube aggregation of primarily particles proceeds rapidly via molten silicon phases within the colloid sticking to other such colloids. When colloids grow by accretion (instead of aggregation), growth tends to form fibers (nanowires) instead of spheres. Traveling down the drift tube 26, the resulting ballista 29 are likely to be a mixture of shapes, providing nucleation sites for further condensation/saturation of other mineralic and metallic vapor species.

At the projected formation rate, virtually all the mass exiting the supersonic nozzle 24 would be converted to colloids instantly (assuming an exit temperature of about 1638 K). As a double-check, Leon et. al. performed computations for aluminum vapor and determined a condensation length of about 0.01 meter. A third means of estimating the overall rate of deposition is to first compute the mean free path for SiO molecules. The cross-section of SiO can be represented by a trapezoid containing two spheres having a diameter of about 1.46 Angstroms and 0.65 Angstrom for silicon and oxygen, respectively. Averaging the area for three orthogonal directions gives an average molecular diameter of about 1.97 Angstroms. Using this in the equation for mean free path (MFP):

$$\lambda = RT/2^{1/2}\pi d^2 N_A P \quad (10)$$

with T=1200 K and P=5 kPa, the MFP is about $1.9e^{-5}$ meters (about 20 micrometers). One can estimate an upper bound on the time at which most of the SiO has deposited as the time required to form sufficient colloidal nuclei such that their spacing is on the order of the mean free path. Setting the number density to the reciprocal of the MFP cubed, and also equal to the rate-time gives:

$$t = (MFP^3 \cdot J)^{-1} \quad (11)$$

This gives a time of about 1 microsecond. At a Mach 2 flow rate of less than 2000 m/s, the required length for the drift tube 26 would be about 0.006 meters. This temperature occurs at a drift tube length of about 1.8 meters, which is taken as the system dimension for the drift tube 26.

In a supersonic nozzle with very low back pressure, the exhaust plume flares out at the exit of the nozzle, resulting in what is called under-expanded flow. The facility 10 preferably employs under-expanded flow to separate oxygen from the rest of the mineral vapor stream 22. Oxygen is gaseous down to 90 K, while all other metal and mineral species in the regolith 12 condense or solidify at much higher temperatures. The skimmers 32, which can be conical frustums placed just outside the ballista trajectory, help divert the oxygen gas flow to the periphery of the expansion region 30 where the pumps 34 await. The size required for a particulate 28 to detach from the vapor stream 22 can be computed as the mass at which drag forces accelerate the particulate 28 to a slip velocity (detached from the flow) equal in magnitude to the flow velocity. Drag force D is given by:

$$D=C_d qA \quad (12)$$

where $C_d$ is the drag coefficient (determined by experiment, and assumed equal to unity here), A is the area, and q is the dynamic pressure. Dynamic pressure is a result of Bernoulli's equation of momentum conservation, dependent on density and velocity V, and is given by:

$$q=\rho V^2/2 \quad (13)$$

Using Newton's second law (F=ma) and the equation for angular acceleration ($a=V^2/R$), we can find the radius r of the ballista 29 by setting a maximum on the acceleration and a reasonable turning radius R. Assuming a spherical geometry (mass=4/3 $\pi r^3$) and R>> drift tube radius, a particle size of approximately 12 micrometers is computed as needed to qualify as ballista 29. The ballista 29 are ejected from the expansion region 32, and can be discarded as a hot slag or used to form additive blocks for shelters and structures. While some oxygen would be expected to be lost along with the ballista 29, the expansion region 30 is sized to limit this loss mechanism to 5% of the oxygen (the opening 46 is 5% of the total cross-section of the expansion region 30).

Scroll pumps are a suitable choice as the pumps 34 for use in a lunar environment. As known in the art, a scroll pump comprises two intertwined spirals, with one spiral orbiting within the other to draw fluid (for example, gaseous oxygen) from the periphery to the center of the spirals. Scroll pumps are used in a number of commercial applications, and generally have a long lifetime because of the simplicity of the design and the small number of moving part. In the facility 10, multiple scroll pumps 34 are preferably used to exhaust gaseous oxygen from the periphery of the expansion region 30. The scroll pumps 34 sequester the oxygen for pre-cooling with the radiative cooling tube within the plenum 36, and then absorbed by a cryocooler or other suitable device.

U.S. Pat. No. 4,697,425 to Jones discloses a chemisorption cryocooler that is suited for producing liquid oxygen from gaseous oxygen. In brief, Jones discloses the use of praseodymium-cerium-oxide (PCO) as a sorption bed for oxygen at about 300 K, at pressures at or below atmospheric. In FIG. 1, a PCO sorption bed 62 is shown incorporated into the plenum 36. Once saturated with oxygen, the PCO bed 62 is heated to about 600 K to produce a high pressure gas (for example, up to about 100 atmospheres). After radiative pre-cooling, the gaseous oxygen is passed through a valve, such as a Joule-Thompson valve, which causes the gas to expand and partially liquefy. Full liquefaction can be completed by the liquefaction apparatus 40, such as a lightweight thermoelectric cooler formed of, for example, $Yb_{14}MnSb_{11}$, which is believed to outperform all other devices using the Peltier effect. Though requiring a hot side of about 1000 to 1200 K, there is no shortage in the facility 10 of high temperatures within this range.

The final output is LOX 38 that can be stored, for example, at about 90 K. As shown in FIG. 1, LOX storage is preferably underground where shade temperatures of 50 to 100 K are readily available at the lunar surface 100. As such, insulation and maintenance cooling requirements are minimal for the LOX storage tank 42. The system model includes cooling oxygen to about 200 K, but does not require mass or power for final cooling of oxygen to a liquid.

Radiative heat loss is believed to be a primary driver of power requirements for the facility 10. The fourth power dependence on temperature of Stephan's law means that power levels increase dramatically with small changes in temperatures around 2950 K. Radiative thermal losses must therefore be vigorously minimized. A standard practice in heat shield designs is to use multiple layers of dimpled tungsten foil. In the environment around the facility 10, there would be little or no oxygen available to attack refractory metals. Consequently, tungsten (melting point 3680 K) would be adequately heat-resistant to serve as a heat shield 56 surrounding at least the process chamber 21 containing the molten regolith stream 16. At locations farther from the molten regolith stream 16, more reflective materials can be used, such as chromium (melting point 2130 K). Therefore, the heat shield 56 could comprise inner layers of dimpled tungsten foil surrounded by outer layers of highly-polished chromium. Because the heat shield 56 would likely be a significant contributor to the overall mass of the facility 10, a high composite reflectance, for example, about 99.7% or more (corresponding to a radiative loss of 0.3%) would be desirable.

Buildup of deposits on the walls of the drift tube 26 would likely be a maintenance issue. Using a worst-case scenario, the mount of solid material deposited on the drift tube walls may be as high as about 5% of the total mass flow rate, though a deposition rate of about 1% is believed to be more likely. The temperature of the drift tube 26 will depend on distance from the nozzle 24, which under the present operating assumptions is at about 1638 K. At this temperature, minerals such as FeO, $Fe_2O_3$ and SiO will revaporize on contact with the walls of the drift tube 26. MgO and CaO are not expected to vaporize, and so are not a concern. However, minerals such as $TiO_2$ and $Al_2O_3$, with melting points of 2116 K and 2327 K, respectively, are likely to deposit on the walls of the drift tube 26. Because $TiO_2$ and $Al_2O_3$ are reported to represent approximately 22% of lunar regolith, a conservative assumption will be used that 1% of the total vapor stream 22 through the drift tube 26 could deposit on the walls of the tube 26.

Various measures can be taken to minimize deposits and/or minimize the need for spare parts. First, the tube 26 may be flared so that its walls move away from the expanding flow of the vapor stream 22. A limitation is the avoidance of sonic shocks inside the drift tube 26 if the tube walls are excessively flared. Another approach is to introduce a step in the drift tube 26 into which oxygen gas is injected, which in simulations has the potential for almost completely eliminating wall deposition. However, some portion of the injected oxygen would escape the tube 26, representing a loss of the desired product of the facility. Yet another method is to swap drift tubes 26 between the facility 10 and a separate station (not shown), where the tube 26 would be heated to allow gravity to slough off the deposits. This approach would require a high-temperature material for the tube 26.

The facility 10 in FIG. 1 shows the non-volatile component 60 of the regolith stream 16 falling and accumulating in a pit 58 beneath the chamber 21. The seal 48 used to maintain the atmosphere within the chamber 21 can be formed in part with regolith that has been heated and pressed to remove porosity. Heating should draw little power from the power supply 63 to the facility, represented in FIG. 1 as comprising an array of photovoltaic cells and a power processing unit (PPU) that delivers power to the various electrical components of the facility 10. The regolith used to form the seal 48 is preferably a fine powder to assure a good seal, and would be readily available from the sieving process described above for the regolith used as the feedstock for the facility 10. By dropping the non-volatile regolith component 60 into the pit 58, the impact of oxygen extraction on the lunar environment can be minimized.

An alternative is to drop the non-volatile component 60 into a bin (not shown), which is sealed to the lower end of the chamber 21. Such a bin would then be periodically replacement, since the slag will be very difficult to clean as a result of being composed of magnesia and calcia with melting points well above 3000 K. However, the use of a slag bin offers certain benefits, including increased portability, a readily fabricated seal between the bin and lower end of the chamber 21, and harvesting of waste heat. Waste heat harvested from the bin could be used to operate the liquefaction apparatus 40, thereby saving system power. Waste heat can also be used to drive a Sterling cycle engine to provide mechanical power to the facility 10 or another installation. The mechanical power could be used, for example, to load the next batch of regolith into the hopper 14.

The facility 10 is configured to allow for considerable automation. After installation on the lunar surface 100 (or another suitable location), a single mechanical movement would be sufficient to initiate operation, namely, loading the pre-melt hopper 14 with regolith fines. The facility 10 is capable of a long operational life, with only two moving parts: the hopper lid 50 and the pumps 34. The life of the hopper lid 50 can be promoted by keeping it clear of deposits, such as by heating. The scroll pumps 34 are known for their longevity.

The facility 10 is configured to minimize unwanted deposits. Nearly all deposits can be removed by applying heat in the absence of a regolith charge, which considerably simplifies maintenance and avoids the need for robotic manipulation on the lunar surface.

Regolith fines are known to contain trace amounts of volatiles, including valuable elements such as hydrogen, nitrogen, carbon, chlorine, sulphur and helium (including possibly $He^3$). Apollo mission data suggest approximate values for volatile fractions at about 973 K. Table II below indicates the virgin concentrations in parts per million, and the total mass expected per 96 kg charge of regolith.

TABLE II

| Element | Concentration (PPM) | Total per 96 kg charge (kg) |
| --- | --- | --- |
| Hydrogen | 0.1 to 206 | 0.020 |
| Nitrogen | 4 to 209 | 0.020 |
| Carbon (as CO and $CO_2$) | 4 to 280 | 0.027 |
| Helium | 3 to 84 | 0.008 |

By employing the sealed hopper 14 of FIG. 1 and incorporating a valve (not shown) in the lid 50, these gasses could be harvested during the pre-melt phase. The bypass tube 54 would require a device, such as a hinged cap (not shown), to prevent backflow into the process chamber 21. Sufficient time would exist to remove these gases from the chamber 21 in view of the temperature (about 1000 K) at which these gases would be released, and the temperature (about 1400 K) when FeO would start to melt.

Assuming a 96 kg charge and a flow rate of about 0.013 kg/s, the process time per batch would be about 2.5 hours. Heating the hopper 14 to liquefy the regolith 12 is estimated to require about forty-five minutes, and loading a new batch of regolith 12 is estimated to take about ten minutes (about 0.16 kg/s), which could be performed with a conveyor or augur that delivers the new charge from a batch of pre-sieved regolith fines. Consequently, an estimated total cycle time would be about 200 minutes, during which operations are active about 75% of that time.

At the on-set of lunar night, the facility 10 and/or certain of its components would be baked to remove buildups and then allowed to cool gradually. Prolonged storage at lunar temperatures of as low as 100 K is not expected to present any problems.

Figure 3:
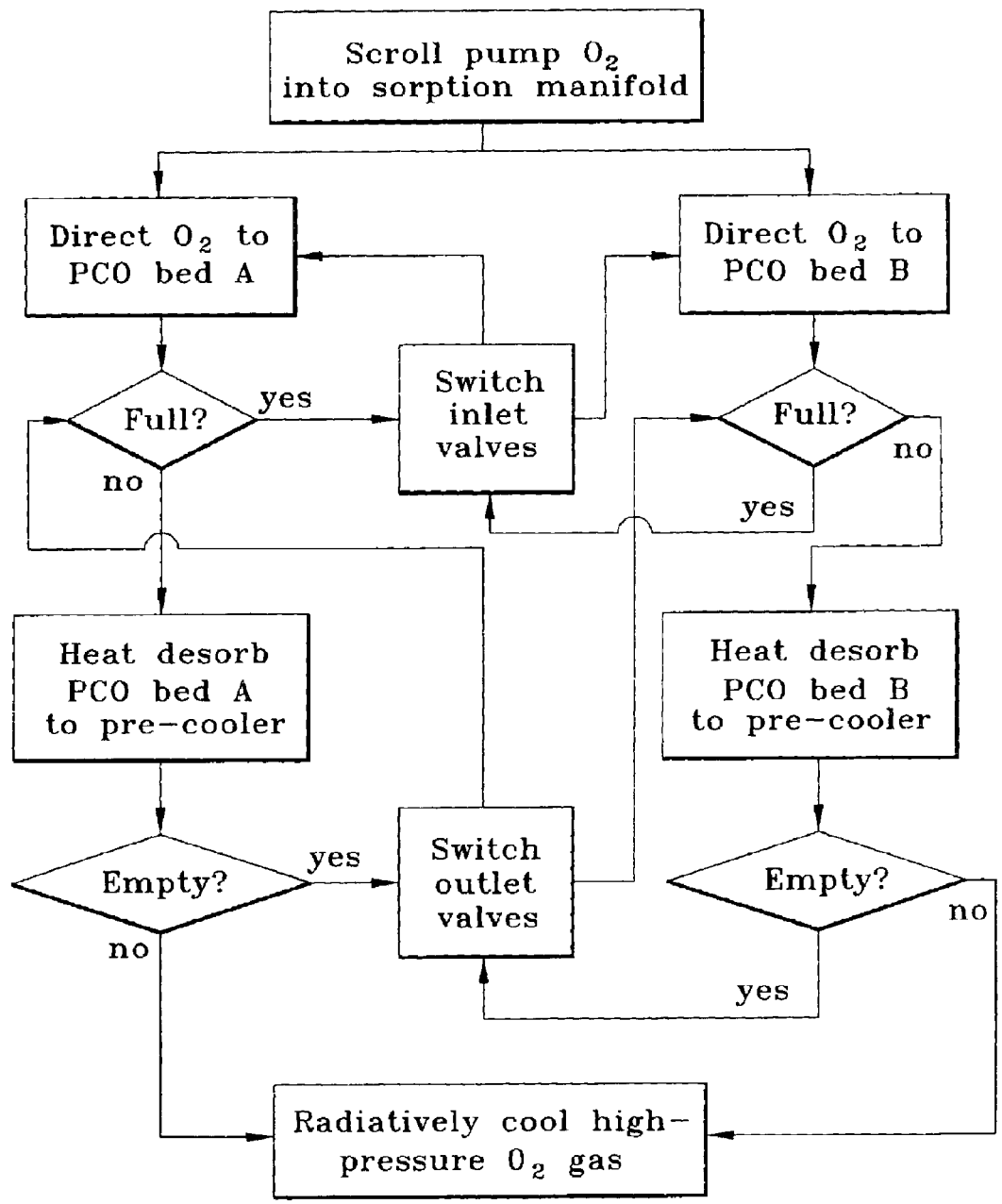
FIG. 3 is a flow chart represented an operation sequence for oxygen sorption, chilling, and liquefaction in accordance with an embodiment of the invention.

The sequence of operations for oxygen pumping, sorption, chilling and liquefaction is represented in FIG. 3. PCO beds are generally believed to saturate at about 1% of their total mass. To keep the throughput of the facility 10 high, continuous operation would likely require at least two PCO sorption beds 62. Similar systems have been operated for over 10,000 hours of continuous operation.

Modeling of the facility 10 represented in FIG. 1 has been performed to confirm the operation of the facility 10 and identify certain operating parameters, geometries, and materials that should provide guidance when constructing an operational model of the facility 10. The model was limited to one-dimensional, first order equations, and every attempt was been made to justify parameter and material selection with hard data. When data was less reliable, assumptions were made conservatively.

A first aspect of the model considered the transformation of a condensed phase (solid or liquid) into a vapor, which involves the conversion of thermal energy supplied to the evaporant into mechanical energy as represented by the expansion into vapor. According to the second law of thermodynamics, some of this conversion energy must increase the entropy of the system, and is not available for producing mechanical energy. This energy balance is commonly expressed by:

$$\Delta G = \Delta H - T \Delta S \qquad (14)$$

where $\Delta G$, $\Delta H$, and $\Delta S$ are the changes in Gibb's free energy, in enthalpy, and entropy associated with the process, respectively. Free energy changes are relatively small compared to bulk heating with the large temperature increases used in the facility 10, but were included in the model for completeness.

Evaporative flux (in equilibrium) from the surface of the regolith melt 12 is given by the Hertz-Knudsen equation:

$$dN_e/A_e dt = \alpha_v (2\pi mkT)^{1/2}(p^*-p) \qquad (15)$$

where $\alpha_v$ is the evaporation coefficient (empirical), p* is the equilibrium vapor pressure, and p is the hydrostatic pressure. In the model, the evaporative flux was computed from the free-falling molten regolith stream 16 using $\alpha_v=1$ and p=0, and compared to the mass flow rate though the nozzle 24. As long as the vaporization rate is greater than the nozzle flow rate, the flow exiting the nozzle 24 remains supersonic.

The facility 10 is a derivative of thermal pyrolysis, and as such is a high-temperature process. Through heating of the molten regolith stream 16 during free-fall, contact between the containment walls 20 of the chamber 21 and the vaporing liquid within the stream 16 can be avoided. Radiative cooling can be used to maintain the containment walls 20 of the chamber 21 and the supersonic nozzle 24 at temperatures around 2000 K, where a great deal of terrestrial experience already exists. On this basis, various materials for the components of the facility 10 have been considered. Thorium oxide ($ThO_2$) has the highest melting point of all oxides and is a desirable material for use at 3000 K in oxidizing atmospheres. However, thorium is mildly radioactive and there currently does not appear to be any domestic sources of formed thorium dioxide components. Hafnium oxide ($HfO_2$) is an excellent choice for the range of material temperatures needed for the facility 10, and hafnia ($HfO_2$) is a common material, reasonably priced, and available from many sources. Mixtures of hafnia with other refractories are capable of providing excellent thermal characteristics with superior wear behavior, an important consideration in the design of the supersonic nozzle 24. Hot isostatic pressing (HIP) of hafnia powders can be used to create billets up to a half meter cubed, suitable for machining into the hopper 14, containment walls 20 of the chamber 21, and the supersonic nozzle 24. Because hafnia is relatively dense (9500 kg/m$^3$) and would require wall thicknesses of several centimeters, components fabricated from hafnia will be massive. Consequently, other suitable materials for the hot components of the facility 10 would be of interest and within the scope of the invention.

Geometries for the facility 10 and its various components are preferably designed backward from the desired production rate of oxygen from the facility 10. Working back to total vapor mass flow rate, and assuming a drift tube cross-sectional area, permits computation of the throat dimensions of the nozzle 24 needed for a vapor stream flow rate of, for example, Mach 2. As an example, for a drift tube 26 having a cross-sectional area of about 0.0006 m$^2$ area, the nozzle throat diameter of about 0.022 meter was calculated. At an exit temperature of about 1638 K, Mach 2 is about 1549 m/s.

The expansion region 30 is represented in FIG. 1 as an enclosed half-sphere with an opening 46 for ballista 29 at its center. As previously noted, the cross-sectional area of the expansion region 30 can be selected to be, for example, twenty-times larger than the ballista opening 46. With the assumption of radially-uniform under-expanded flow at the drift tube exit, it is believed that oxygen losses can be limited to about 5%. More than this may be lost in practice, giving reason for selecting the oxygen component of vapor at the lower end of the 20-24% range.

The hopper 14 can be designed to hold any suitable amount of regolith, for example, about 80 to about 100 kg. The chamber 21 can be sized to be slightly larger than the area needed for the molten stream 22 in order to reduce system mass, reduce surface area for radiative heat loss, and minimize the volume of gas which may become heated by the RF field. Rapid inductive heating permits the use of a single, rather thick, stream 16 of magma. However, once the system reaches full operating pressure, the surface area of a single stream 16 may not support the evaporation rate, and the stream 16 could begin to boil and emplace nonvolatile deposits on the walls 20 of the chamber 21. To address this concern, multiple streams 16 from smaller apertures 44 could be employed. In this way, the total surface area of the molten regolith streams 16 available for evaporation would be increased, so that boiling is minimized. Multiple apertures 44 of sufficiently small diameters could avoid the risk of boiling altogether. However, to support these apertures 44, the diameter of the hopper 14 and chamber 21 would also likely need to be increased.

Figure 4:
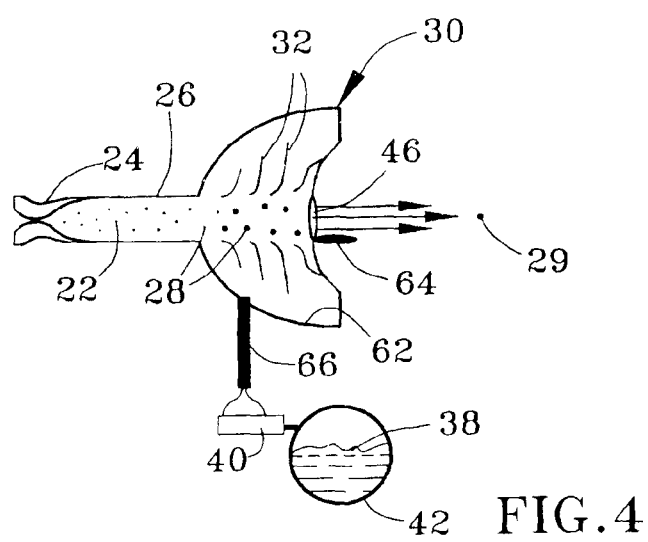
FIG. 4 schematically represents an alternative oxygen sequestration section for the oxygen extraction apparatus of FIG. 1.

In an alternative embodiment of the expansion region 30, it may be possible to omit the pump 34 and plenum 36 by causing the oxygen gas to impinge directly on a sorption bed 62 placed on the interior surface of the expansion region 30, as represented in FIG. 4. By omitting the pump 34, the inefficiencies associated with the pump 34 operating within a low partial pressure of oxygen in the expansion region 30 and the vacuum on the Moon can be avoided. The surface area of the sorption bed 62 would be preferably high, and may be accomplished by increasing the size of the expansion region 30, corrugating the interior surface of the expansion region 30, and/or applying multiple layers of the sorption material (e.g., PCO) with intervening empty spaces therebetween within which oxygen can migrate and be absorbed. Because the sorption bed 62 would require a degassing period to harvest the oxygen, the expansion region 30 is shown as capable of being periodically sealed off, for example, using hatches 64 (one of which is shown) to seal the region 30 from the drift tube 26 and the lunar atmosphere. The region 30 can then be heated to release the oxygen stored on its sorption bed 62, and then collected through a valve (not shown) into a pipe 66 that feeds the gas to a liquefaction apparatus 40, basically as described in reference to FIG. 1.

Another option for de-gassing the expansion region 30 of FIG. 4 is to provide two or more such regions 30, and simply swap them out. An off-line chamber can then be used to heat the sorption bed 62 to release the absorbed oxygen, and liquefaction can proceed as described in reference to FIG. 1.

A number of variants on these two method can be envisioned. For example, increasing the surface area of the sorption bed 62 may be accomplished with porous materials, highly fractal surfaces, re-entrant nooks and crannies, etc. The method of swapping out expansion regions 30 can be extended to limited sections of the regions 30, or extended to complex arrangements whereby components are swapped out quickly and with minimal disruption to the process. The construction and function of the hatches and valves for FIG. 4 may be performed by various other known devices.

While the invention has been described in terms of specific embodiments, it is apparent that other forms could be adopted by one skilled in the art. For example, the physical configuration of the facility 10 and its components could differ from that shown, and materials and processes other than those noted could be used. Therefore, the scope of the invention is to be limited only by the following claims.

The invention claimed is:

1. A facility for extracting oxygen from a mineral-containing solid material, the facility comprising:
   means for containing the solid material;
   means for forming a free-falling molten stream of the solid material;
   means for evaporating at least a portion of the molten stream and producing a vapor containing gaseous oxygen;
   means for creating a supersonic stream of the vapor;
   means for condensing constituents of the supersonic stream to form particulates within the supersonic stream;
   means for separating the gaseous oxygen from the particulates; and
   means for collecting the gaseous oxygen.

2. The facility according to claim 1, wherein the solid material is regolith.

3. The facility according to claim 1, wherein the evaporating means does not physically contact the molten stream.

4. The facility according to claim 1, wherein the creating means is a convergent-divergent nozzle.

5. The facility according to claim 4, wherein the convergent-divergent nozzle has an axis transverse to an axis of the molten stream.

6. The facility according to claim 1, wherein the condensing means cools the supersonic stream.

7. The facility according to claim 1, wherein the separating means expands the supersonic stream and deflects the gaseous oxygen away from the supersonic stream.

8. The facility according to claim 1, wherein the collecting means liquefies the gaseous oxygen.

9. The facility according to claim 1, wherein the facility is located in a micro-gravity or low gravity environment.

10. The facility according to claim 1, wherein the facility is located in a near-vacuum environment.

11. The facility according to claim 1, wherein the facility extracts oxygen in an extraterrestrial environment in which the solid material is present.

12. A process for extracting oxygen from a mineral-containing solid material, the process comprising:
   forming a free-falling molten stream of the solid material;
   evaporating at least a portion of the molten stream and producing a vapor containing gaseous oxygen;
   creating a supersonic stream of the vapor;
   condensing constituents of the supersonic stream to form particulates within the supersonic stream;
   separating the gaseous oxygen from the particulates; and then
   collecting the gaseous oxygen.

13. The process according to claim 12, wherein the solid material is regolith.

14. The process according to claim 12, wherein the molten stream does not physically contact a solid structure during the evaporating step.

15. The process according to claim 12, wherein the supersonic stream is created by a convergent-divergent nozzle.

16. The process according to claim 15, wherein the convergent-divergent nozzle has an axis transverse to an axis of the molten stream.

17. The process according to claim 12, wherein the constituents of the supersonic stream are condensed by cooling the supersonic stream.

18. The process according to claim 12, wherein the gaseous oxygen is separated from the particulates by expanding the supersonic stream and deflecting the gaseous oxygen away from the supersonic stream.

19. The process according to claim 12, wherein the gaseous oxygen is collected as liquid oxygen.

20. The process according to claim 12, wherein the process is performed in a micro-gravity or low gravity environment.

21. The process according to claim 12, wherein the process is performed in a near-vacuum environment.

22. The process according to claim 12, wherein the process extracts oxygen in an extraterrestrial environment in which the solid material is present.

* * * * *